United States Patent
Hill et al.

(10) Patent No.: US 12,299,776 B2
(45) Date of Patent: May 13, 2025

(54) METHOD AND SYSTEM FOR COLOUR VIDEO PROCESSING

(71) Applicant: Rovco Limited, Bristol (GB)

(72) Inventors: Lyndon Hill, Bristol (GB); Iain Andrew Wallace, Bristol (GB)

(73) Assignee: Rovco Limited, Bristol (GB)

(*) Notice: Subject to any disclaimer, the term of this patent is extended or adjusted under 35 U.S.C. 154(b) by 413 days.

(21) Appl. No.: 17/762,944

(22) PCT Filed: Sep. 16, 2020

(86) PCT No.: PCT/EP2020/075837
§ 371 (c)(1),
(2) Date: Mar. 23, 2022

(87) PCT Pub. No.: WO2021/058347
PCT Pub. Date: Apr. 1, 2021

(65) Prior Publication Data
US 2022/0335663 A1    Oct. 20, 2022

(30) Foreign Application Priority Data
Sep. 24, 2019   (EP) .................. 19199264

(51) Int. Cl.
*G06T 11/00*     (2006.01)
*G06T 3/4015*    (2024.01)
(Continued)

(52) U.S. Cl.
CPC .......... *G06T 11/001* (2013.01); *G06T 3/4015* (2013.01); *G06T 7/73* (2017.01); *G06V 10/56* (2022.01)

(58) Field of Classification Search
CPC ....... G06T 11/001; G06T 3/4015; G06T 7/73; G06T 1/0007; G06V 10/56
See application file for complete search history.

(56) References Cited

U.S. PATENT DOCUMENTS 5,418,565 A   5/1995 Smith
5,629,734 A   5/1997 Hamilton, Jr. et al.
(Continued)

FOREIGN PATENT DOCUMENTS

EP    2909811 A1    8/2015
WO    2008111927 A3   11/2008
(Continued)

OTHER PUBLICATIONS

Buades et al., "Joint Denoising and Demosaicking of Raw Video Sequences", Department Mathematics and Computer Science, 2018.
Doutre et al., "A Fast Demosaicking Method Directly Producing YCbCr 4:2:0 Output", Natural Sciences and Engineering Research Council of Canada, Oct. 16, 2006.
(Continued)

*Primary Examiner* — Samir A Ahmed
(74) *Attorney, Agent, or Firm* — Potomac Law Group, PLLC; John J. Penny, Jr.

(57) ABSTRACT

A computer implemented method (82) for colour video processing, the method comprising: receiving a CFA image from a CFA imaging device, wherein the CFA image comprises CFA image pixels defining a plurality of image regions, each image region having at least one pixel of a first colour and at least one pixel of a second colour, at least one image region representing a portion of an object; receiving a full colour image from a colour imaging device, wherein the full colour image represents the portion of the object; storing the full colour image in a memory; isolating pixels of the first colour of the CFA image to generate a first colour channel comprising pixels of the first colour channel; isolating pixels of the first colour of the full colour image to generate a second colour channel comprising pixels of the second colour channel; processing the pixels of the first colour channel using a first computer vision algorithm to generate first image metadata; processing the pixels of the second colour channel using the first computer vision algorithm to generate second image metadata; and generating (Continued)

processed data using the first image metadata and/or the second image metadata, the processed data comprising a plurality of data points representing the object.

17 Claims, 8 Drawing Sheets

(51) Int. Cl.
  *G06T 7/73* (2017.01)
  *G06V 10/56* (2022.01)

(56) References Cited

U.S. PATENT DOCUMENTS

| | | | |
|---|---|---|---|
| 8,345,971 B2 | 1/2013 | Zhang et al. | |
| 2012/0019694 A1 | 1/2012 | Tin | |
| 2016/0080626 A1* | 3/2016 | Kovtun | G06T 5/70 348/218.1 |
| 2018/0189956 A1 | 7/2018 | Mehr | |

FOREIGN PATENT DOCUMENTS

| | | |
|---|---|---|
| WO | 2016043819 A1 | 3/2016 |
| WO | 2019104047 A1 | 5/2019 |

OTHER PUBLICATIONS

EP Search Report and Written Opinion for EP Application No. 19199264 dated Dec. 3, 2019.
GB Examination Report for GB Application No. 1913734.9 dated May 7, 2020.
GB Search Report for GB Application No. 1913734.8 dated Mar. 27, 2020.
International Search Report and Written Opinion for International Application No. PCT/EP2020/075837 dated Dec. 1, 2020.
Salamati et al., "Incorporating Near-Infrared Information into Semantic Image Segmentation", Xerox Research Center Europe, Jun. 24, 2014.
Zhang et al., "Partial Demosaicing for Stereo Matching of CFA Images on GPU and CPU", Infocomp, 2013.
Office Action issued in Japanese Application No. 2022-519328 dated Oct. 23, 2023.

* cited by examiner

METHOD AND SYSTEM FOR COLOUR VIDEO PROCESSING

BACKGROUND

When surveying a subsea site, asset, environment, or any other harsh environment facility it is typical to use a mobile survey device such as a robot or remotely operated vehicle. For brevity, such facilities will be referred to as a survey site and such survey devices will be referred to as a mobile device.

A mobile device can include one or more cameras to image the survey site. For computer vision applications a colour camera is typically connected to a processor to receive a full colour image and generate metadata, for example 3D information.

The present inventors have devised a new mobile device and method which can enable fast and efficient video processing of colour images.

SUMMARY

By way of a non-limiting overview, embodiments of the invention relate to a system for efficient colour video processing of Colour Filter Array (CFA) images so that less data is transferred internally (e.g. from RAM to a processor core) when performing certain tasks such that those tasks can be performed faster. A known type of colour camera captures a CFA image and demosaics (on camera) and interpolates to generate three colour channels per pixel over the whole image, tripling the size of the data, to produce the full colour image. Thus, a CFA imaging device or CFA camera outputs the CFA image without further processing of the image. For computer vision applications, the full colour image and metadata require a high bandwidth link for transferring to other applications or visualisers.

In accordance with a first aspect of the invention, there is provided a computer implemented method for colour video processing, the method comprising:
- receiving a CFA image from a CFA imaging device, wherein the CFA image comprises CFA image pixels defining a plurality of image regions, each image region having at least one pixel of a first colour and at least one pixel of a second colour;
- receiving a full colour image from a colour imaging device distinct from the CFA imaging device, wherein the full colour image can comprise demosaiced image pixels, wherein an object is imaged by both the CFA imaging device and the colour imaging device and is represented in the CFA image and the full colour image;
- storing the full colour image in a memory;
- isolating pixels of the first colour of the CFA image to generate a first colour channel comprising pixels of the first colour channel;
- isolating pixels of the first colour of the full colour image to generate a second colour channel comprising pixels of the second colour channel;
- processing the pixels of the first colour channel using a first computer vision algorithm to generate first image metadata;
- processing the pixels of the second colour channel using the first computer vision algorithm to generate second image metadata; and
- generating processed data using the first image metadata and/or the second image metadata, the processed data comprising a plurality of data points representing the object.

Thus, the method according to the first aspect uses an asymmetric camera system having a CFA imaging device in combination with a full colour imaging device to perform computer vision processing. Using both a CFA imaging device and a colour imaging device provides a synergistic effect for video processing which can increase processing efficiency, allowing computer vision tasks to be run accurately in harsh environments and in real time. The asymmetric system is also well suited to live processing of data. This can enable a 3D model of a survey site to be generated in a harsh environment in real time without the need for post processing.

The method involves processing colour video data to generate processed data (for example, 3D model data) comprising a plurality of data points representing an object. The method of processing colour video data is a technical contribution to the art of colour video processing that can result in more efficient processing of data, allowing for real time processing of such data instead of post processing. This can enable real time decision making should a survey reveal a dangerous situation for example.

The method can result in increased processing efficiency on the computer of the mobile device implementing the method i.e. a reduction in computational load in order to generate the processed data. This can enable real time processing with at least the same accuracy as a conventional system but with reduced power consumption, reduced thermal constraints, and fewer and/or less powerful processors.

Moreover, the processing of high resolution CFA images and lower resolution colour images with the above method can enable almost double the output resolution or a bandwidth of half of that of a known system. In comparison to a conventional system, the method can result in a higher frame rate, higher spatial resolution, higher colour resolution, and/or full colour conventional 2D images for the same processing capability.

Conventional steps of calculating luminance and downsampling images can be partially, and in some cases fully, avoided. They can be avoided because a single colour channel is a suitable proxy for luminance, especially in subsea environments. The majority of tasks in (stereo) video processing and computer vision use luminance. The luminance-chrominance representation uses brightness and colour differences. Luminance is derived from a combination of the Red, Green and Blue (RGB) colour channels (or other colour channels depending on the camera sensor at acquisition time), the exact formula is dependent on the final application. The present inventors found that a single colour channel can provide a sufficient proxy for luminance to perform video processing and computer vision, for example, tracking or matching algorithms. Using CFA images means less data is transferred around the system and full colour images can be demosaiced at a later stage. Therefore the method can involves running at least one camera with a "RAW" configuration so that images are not demosaiced. This means the full colour image is not required to be generated until later in the process when it is required or convenient to do so.

The full colour image, such as that provided by the colour camera, is useful for live views, and full colour images can be registered with 3D points to generate a colour 3D model.

Thus, image processing and/or computer vision algorithms are performed directly on the CFA images so that less data must be transferred between processors, while retaining the ability to recover full colour images if needed later. In constrained bandwidth situations such as harsh environments it is necessary to carefully control the amount of data flow, to make efficient use of the transmission bandwidth available. Running in RAW capture mode allows us to use higher capture frame rates and more images to be stored in cache. When working in RAW a High Dynamic Range can be captured (such as 16 bits per pixel) and the image can be bit shifted to a low colour resolution, such as eight bits per pixel, to simplify the images for processing. This can reduce the storage requirements on the hardware. This is in contrast to a conventional demosaiced 8 bit output as YUV 4:2:2 (16 bits per pixel) (subsampled colour), this can be the output of the colour imaging device.

The cameras can be synchronised. If the cameras are calibrated, then the relative position of the demosaiced camera can be determined through pose. If the cameras are not synchronised then the relative position of the demosaiced camera can be determined through pose and interpolation of odometry.

The step of isolating pixels does not necessarily isolate and generate a first colour channel with all pixels of the first colour of the CFA image. The step of isolating pixels can for example comprise some but not all of the pixels of the first channel of the CFA image.

The size and/or resolution of each colour channel can vary such that one colour channel has a greater resolution than the other.

The memory can be volatile or non-volatile memory storage.

An image region can comprise a single fundamental CFA pattern comprising at least one of each colour pixels. For example, if the CFA pattern is a Bayer pattern, then the image region may comprise at least a square comprising two green pixels, one red pixel, and one blue pixel.

The CFA imaging device and colour imaging device can be set up in a stereo system. For stereo processing systems it is not a requirement to use full resolution images; e.g. depending on the application, 4K video frames may have more detail than is required for tracking. Therefore, only the single colour channel from the CFA images are required to be used, and further it may not be necessary to perform interpolation of all the single colour channel pixels to make a full resolution image.

When full resolution is required by the application, not all the frames from the video are needed, for example some algorithms only need key frames or other infrequently useful frames.

The first colour channel of the full colour image can be the same as the first colour channel of the CFA image. For example, if the first colour channel is the green colour channel, then the second colour channel is also the green colour channel. Colour channel can be defined as a channel which comprises only the data representing the intensity of light passing through a specific colour filter (e.g. a green (G) colour filter of a RGB filter array, such as a Bayer filter).

The CFA image can have a higher dynamic range per pixel than the full colour image. For example the CFA image may have a dynamic range of 16 bits per pixel, whereas the full colour image may have a dynamic range of 8 bits per pixel. This is mainly due to strict bandwidth constrains.

The method of the first aspect can generate colour processed data by modifying the colour of each data point using at least one pixel of the second colour of the corresponding image region of the second CFA image. This results in a colour processed data that is substantially identical to colour processed data that could be generated by video processing in full colour but with reduced processing power.

The method of the first aspect can further comprise:

correlating a data point or each data point with a corresponding image region of the full colour image; and generating colour processed data by modifying the colour of the or each data point using one or more pixels of the full colour image.

An advantage associated with the processing of colour video of the first aspect is that the CFA imaging device can produce lower bandwidth data in comparison to the full colour imaging device (assuming the same frame rate). This can result in faster processing of the CFA image to produce the processed data, however, it is desirable for the processed data to be coloured. Therefore, the full colour image stored on the memory can be used to colour the processed data. If colour comes from only one camera then there is no need to colour match when rendering/modifying the colour of the or each data point. Colour matching would be necessary if more than one camera captures colour information for rendering/modifying the colour of the or each data point. This results in the benefits from the faster processing and avoids the need for demosaicing the CFA image.

The first and/or second image metadata comprises at least one of: motion; disparity; edges; and segmentation.

The processed data can comprise at least one of: key frame; selective image segment; and 3D model data.

3D model data can be generated by a 3D reconstruction algorithm.

If the processed data is a key frame or a selective image segmentation then the step of generating processed image data can be achieved with only one of the first or second image metadata.

In the case of underwater 3D survey, a 3D model of the object/scene can be incrementally built from 3D model data, periodically adding batches of new points to the model as more images are processed. Full colour can be generated when unique data points (e.g. 3D model points) are found, the full colour can be from the full colour image or demosaicing the CFA image.

The second image metadata can be processed with an object detection algorithm, to detect the object in the full colour image, and assign a label and location to the object. Object detection algorithms are well suited to processing full colour images.

The first image metadata can be processed with an object detection algorithm, to detect the object in the first image, and assign a label and location to the object. The first image metadata may be better suited for object detection if the CFA image is of a higher resolution than the full colour image. This is particularly true if the object for identification is only represented in a small percentage of the full (captured) image. The small percentage may be 10%, 5%, 3%, 1%, or 0.5% of the full image area.

The first colour channel can be green. When underwater, red light is attenuated by the water making the green channel even more dominant. Thus, a good proxy for luminance can be the green channel. The green pixels can be used instead of luminance in the previously mentioned algorithms. In low light vehicle (e.g. autonomous car) driving conditions the red channel may be desirable, as in this condition red is a good proxy for luminance.

The method can further comprise demosaicing the CFA image to generate a demosaiced full colour image. The demosaiced full colour image can be used to modify the colour of each data point, for transmitting to a thin client, or for storing for post processing.

Generating the first colour channel can comprise interpolating void pixels from the isolated pixels of the first colour to generate a full resolution first colour channel image of the CFA image prior to the step of processing the pixels of the first colour channel using a first computer vision algorithm to generate first image metadata.

Void pixels are pixels with no associated colour information. They can result from disregarding certain colours from a CFA image, where those colours of the CFA image have been disregarded is an absence of colour information in the corresponding pixels of the CFA image. The process of interpolation generates colour information for the void pixels.

Isolating pixels of the first colour of the full colour image (which are at full resolution) can further comprise downsampling the pixels of the first colour of the full colour image to generate the second colour channel.

The colour processed data can be transmitted to an external computing device via a low bandwidth link.

Transmission of full colour high resolution video from underwater to the top side can be restricted by the low bandwidth tether. Therefore for underwater 3D survey in particular, it is convenient to implement (stereo) processing near the camera and transmit low bandwidth 3D data such as a point cloud plus colour for each point; thus live colour 3D data can be transmitted to the boat/top side. At the camera, the CFA images can either be stored directly or demosaiced then stored as colour video for when the camera(s) have been retrieved from the water.

The data points can be 3D model data points. The step of generating processed data can further comprise:
  processing the first image metadata with a feature detection algorithm, to detect a first feature in the CFA image;
  processing the second image metadata with a feature detection algorithm, to detect a second feature in the full colour image; and
  generating one of the plurality of data points based on the first feature and the second feature.

Feature detection algorithms are well known in the art of computer vision. The first and second features can be the same feature on the object (for example, a corner of a box). Since both cameras have slightly different but overlapping views, the feature can be present and identified in both images (CFA and full colour) separately and further used to generate a 3D model data point.

The first feature in the CFA image can be tracked with a feature tracking algorithm. Since the CFA image can be of low bandwidth in comparison to the full colour image, and the first feature has already been identified, the first feature can be tracked efficiently and quickly with the CFA image. Tracking a feature is more computationally efficient than detecting it again. Thus, if a feature can be tracked then it will be, this can occur prior to full feature detection.

The 3D model can be used to navigate around/through an environment autonomously and in real-time.

Some or all of the steps of the method of the first aspect can be performed in a harsh environment such as a subsea environment.

In accordance with a second aspect of the invention, there is provided a method of surveying an environment, the method comprising:
  moving a mobile device within a survey site, the mobile device implementing the method of the first aspect.

Thus, the video processing is suitable for an environmental survey and the resolution and the frame rate of the plurality of CFA images and full colour images can be selected based on the stage of the survey process. The first and second resolutions and the first and second frame rates of the plurality of CFA images and full colour images can be selected based on a measure of relative light levels of a survey site.

The environment can comprise a subsea environment such as an oil & gas pipeline or rig.

The survey task can comprise at least one of: CFA imaging device calibration; feature tracking; feature detection; motion estimation; reconstruction; and disparity estimation.

Thus, for computer vision, full colour information is not required for tasks such as camera calibration, feature detection, feature tracking, motion estimation, reconstruction, disparity estimation etc. All of these tasks can be computationally expensive but do not require full colour images and typically operate on luminance images. However, full colour images can be computationally efficient for object detection algorithms.

In accordance with a third aspect of the invention, there is provided a mobile device for surveying in harsh environments such as subsea, the mobile device comprising:
  a CFA imaging device configured to generate a CFA image;
  a colour imaging device distinct from the CFA imaging device and being configured to generate a full colour image,
  a platform on which the CFA imaging device and the colour imaging device are mounted with an overlapping field of view;
  a first data processor and a second data processor, optionally together configured to execute the method of the first aspect;
  a first data link coupled between the CFA imaging device and the first data processor;
  a first computer memory coupled to the first data processor;
  a second data link coupled between the colour imaging device and the second data processor; and
  a first casing arranged to be mounted on the platform and defining a sealed interior space, at least the CFA imaging device, the first data processor and the first data link being housed within the sealed interior space of the first casing, the CFA imaging device being arranged to face outwardly from the first casing to capture CFA images.

The mobile device can comprise:
  a second casing defining a sealed interior space, the second casing being arranged to be mounted on the platform, wherein the second casing comprises the colour imaging device, the second data processor, and the second data link, the colour imaging device being arranged to face outwardly from the second casing to capture full colour images; and
  a third data link coupled between the first and second data processors, optionally outside of the sealed interior spaces of the first and second casings.

The mobile device can be a subsea camera module for subsea imaging and the environment is a harsh environment and/or deep underwater environment.

The mobile device can comprise a remotely operable or autonomous mobile platform such as an underwater remotely operable vehicle (ROV), an autonomous underwater vehicle (AUV), an unmanned air vehicle (UAV), an unmanned ground vehicle (UGV), an unmanned underwater vehicle (UUV), or an unmanned surface vehicle (USV).

In one example, the mobile device can comprise a subsea remotely operable or autonomous vehicle including a propulsion system, a steering system and a command controller arranged to control the propulsion system and the steering system in accordance with command signals provided from a control station which is remote with respect to the vehicle, or the first data processor.

The casing such as the first and second casings can be a pressure vessel configured to withstand pressure differentials between its exterior and interior or filled with a pressure compensating gas or fluid; enabling the camera module to be continuously used in harsh underwater environments, such as in at least two metres of water, or at least five metres of water, or in at least ten metres of water, and in some cases at least twenty metres of water. In other embodiments the casing can be configured to enable the camera module to be continuously used in other harsh environments such as in a vacuum.

The system can store high resolution versions of the images on the first computer memory for further processing offline while transmitting lower resolution versions of the images to the remote server. The transmitted images may have a lower spatial, temporal or colour resolution; for example the images may be downsampled to half size, key frames could be selected or colour reduced from three channels to a single colour channel.

Optional features of the any aspect can be applied to any other aspect in an analogous manner.

BRIEF DESCRIPTION OF THE DRAWINGS

FIG. 4 is a representation of a CFA;

FIG. 5 is a representation of isolated green colour pixels of the CFA according to an embodiment of the invention;

FIG. 6 is a representation of a green colour channel;

DETAILED DESCRIPTION

Figure 1:
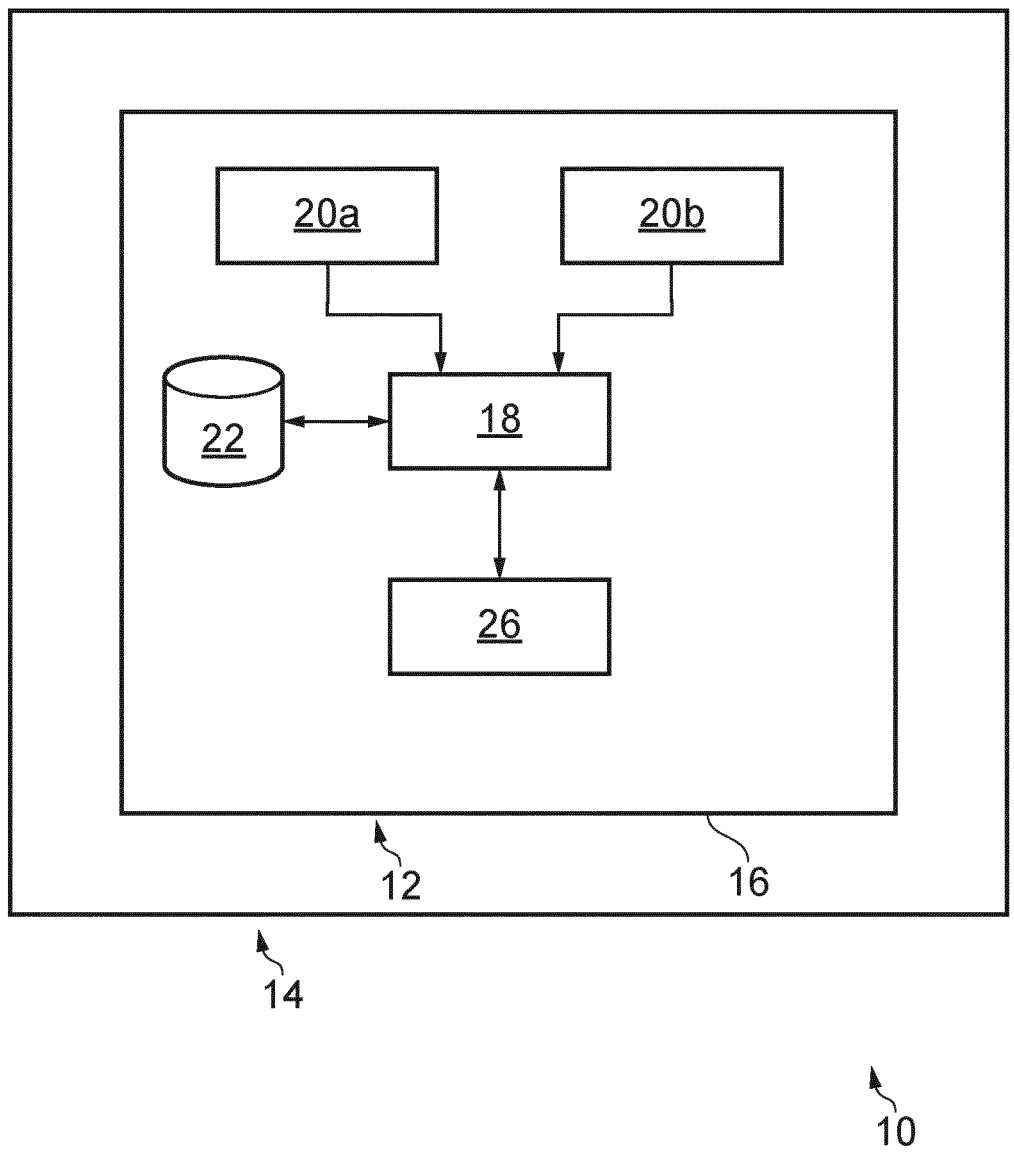
FIG. 1 is a system diagram of a mobile device according to an embodiment of the invention.

Referring to FIG. 1, a mobile device for surveying harsh environments according to an embodiment of the invention is shown generally at 10. The mobile device 10 is arranged for deployment into harsh environments, such as continuous use underwater beyond two metres, subsea, or in the vacuum of space, and can comprise a Remotely Operated Vehicle (ROV), Autonomous Underwater Vehicle (AUV), robotic platform or the like.

Harsh environments place stringent requirements on a camera module, such as mechanical stresses, radiative stresses, chemical reactions and temperature exposure. Mechanical stresses can include pressure, shock, vibration, and coefficient of thermal expansion (CTE) mismatches. Radiative stresses can include cosmic rays, and magnetic influences from electromagnetism. Chemicals such as salt water, moisture, fuel and noxious gases can react with such a camera module. Temperatures below −40° C. and/or above 125° C. can also be experienced in a harsh environment.

The mobile device 10 comprises a computing device 12 mounted on a remotely operable or autonomous vehicle 14. As described in more detail below with reference to FIG. 2, the computing device 12 is housed within a protective casing 16 to enable it to work in a harsh environment such as subsea.

The computing device 12 comprises a data processor 18 communicatively coupled together. The data processor 18 is communicatively coupled to a first camera 20a and a second camera 20b to receive images from the cameras 20a and 20b.

The first camera 20a is a colour filter array (CFA) image camera. A CFA is a system where a colour filter is used to achieve pixels which only capture certain colours in a pattern over an image. CFA imaging devices (e.g. CFA cameras) are cheaper and lighter than three sensor cameras and can be made more compact than colour wheel cameras. CFA imaging devices are generally single sensor devices with a Colour Filter Array in front of the single sensor to output exactly what in received by the single sensor. CFA images are sometimes referred to as "RAW" images.

The second camera 20b is a full colour camera or a generic camera configured to output a full RGB colour image. Colour imaging devices can be CFA imaging devices with an image processor built in to demosaic the CFA image to produce and output a full colour image from the camera. Demosaicing is the process of generating full resolution colour channels from a CFA image. Full resolution is the resolution of the original (captured) CFA image. Demosaicing comprises spatially separating pixels of each colour into partial resolution images/channels. Put another way, demosaicing comprises isolating the each colour filter pixels onto partial resolution colour channels. Partial resolution colour channels are an array of only one colour filter with void pixels where the other colour filters would have been. These partial resolution colour channels can be interpolated to generate a colour channel (of full resolution, i.e. all pixels are of the colour filter) for each colour. Good quality demosaicing algorithms can hide the majority of edge artefacts which can occur during interpolation. The demosaiced CFA image can then combine all colour channels so that each pixel has three colour channels.

Alternatively, the colour imaging device can be a three sensor (one per colour channel, e.g. red, green, blue) device, or a single sensor device with a colour wheel. The CFA camera can also be inexpensive in comparison to the colour camera, partly due to the reduced on-camera processing capabilities which result in less components and reduced power consumption.

The cameras 20a, 20b are mounted in a known spatial arrangement such as being mounted on a common platform 14. The cameras 20a, 20b, are arranged with overlapping fields of view such that an object appears in images output from both cameras but differs in appearance due to a difference in the angle of observation. The images from cameras 20a, 20b, enable the 3D reconstruction algorithm to scale an object size, which can inform the object detection algorithm when a candidate object is an appropriate size, and further make a more accurate 3D model (e.g. 3D point cloud).

The 3D reconstruction algorithm can use overlapping images either from the spatial arrangement of the cameras

20a, 20b. As a result a single data point of a 3D point cloud can have multiple pixels (from multiple images) associated with it.

In other embodiments, one or more further cameras can be provided with different but overlapping fields of view relative to the first and/or second cameras 20a, 20b, or pairs of additional cameras, such that additional views can be used to make object reconstructions from different pairs of cameras. The 3D reconstructions can run in additional data processors, all feeding back to an object detection algorithm.

The data processor 18 can be coupled to other devices such as network interfaces (not shown) and volatile and non-volatile memory 22. The memory 22 can store images, video, or metadata, as well as the algorithms. The data processor 18 can be suitable for computationally complex image processing and computer vision algorithms. For example, the data processor can comprise processing cores including (but not requiring) GPU cores and embedded processing for video codecs or AI operations, such as a NVidia® Tegra™ system on a chip (SoC). The data processor 18 can comprise one or more communicatively coupled cores and/or distinct processors.

The data processor 18 is configured to execute a 3D reconstruction algorithm to develop a 3D model. To generate a 3D model from video or camera images, the 3D reconstruction algorithm can take key points that for example make up the edges of the object in the second image and associates the key points with corresponding key points from other images, such as earlier captured images or images captured concurrently by other cameras. Knowing the camera pose associated with each image, rays can be projected from the camera positions through the key points of each image and points where the rays for a particular point intersect or are best fit in 3D space represent the 3D location of the corresponding points in the 3D model. The 3D reconstruction algorithm can be Structure from Motion or any other appropriate technique that generates a 3D model from video or camera images. The 3D model can for example comprise a point cloud. The 3D reconstruction algorithm can either start building the 3D model from a pair of images, or can use the second image to augment a 3D model already being constructed by the data processor.

To create an accurate 3D model the 3D reconstruction algorithm requires multiple input images. Put another way, to model a 3D object, multiple images at different angles around the object help to build up a more reliable 3D model of the object. If two images are taken sequentially and the camera 20a (or camera 20b) has a high capture rate then the two images are likely to be very similar and the latter image received will add little information over the previous image. "Key frames" can be defined by the degree of difference between two unique views of an object. The 3D reconstruction algorithm can be arranged to compare a received third image with the preceding second image (or an earlier image) to determine the degree of difference. The third image can contain the object from a different view point with respect to the second image due to movement of the object and/or camera 20a (or camera 20b). Once a difference threshold has been exceeded the received image is marked as a key frame. In other embodiments key frames can be identified by a data processor other than the data processor 18 and/or other means such as waiting a fixed time between key frames, e.g. 1 second or selecting every nth frame. Alternatively an inertial measurement unit can be used to determine the camera position has moved enough to initiate a key frame.

The 3D reconstruction algorithm can process all of the input images and select key frames to add points that fit well with the model under construction. Points from the key frames are joined to form a point cloud that can be processed into mesh and rendered as a solid object with computer graphics. Every time a key frame is added, the camera view is typically a unique view on the model. Unique views are ideally suited for input to object detection algorithms, as a full set of key frames can provide all the views of an object necessary to create a complete model of the object. An object detection algorithm can be run on the mobile device 10 or remotely, for example on a server.

In the illustrated embodiment the computing device 12 further comprises a data transceiver 26, which can for example comprise a wireless base station.

Figure 2:
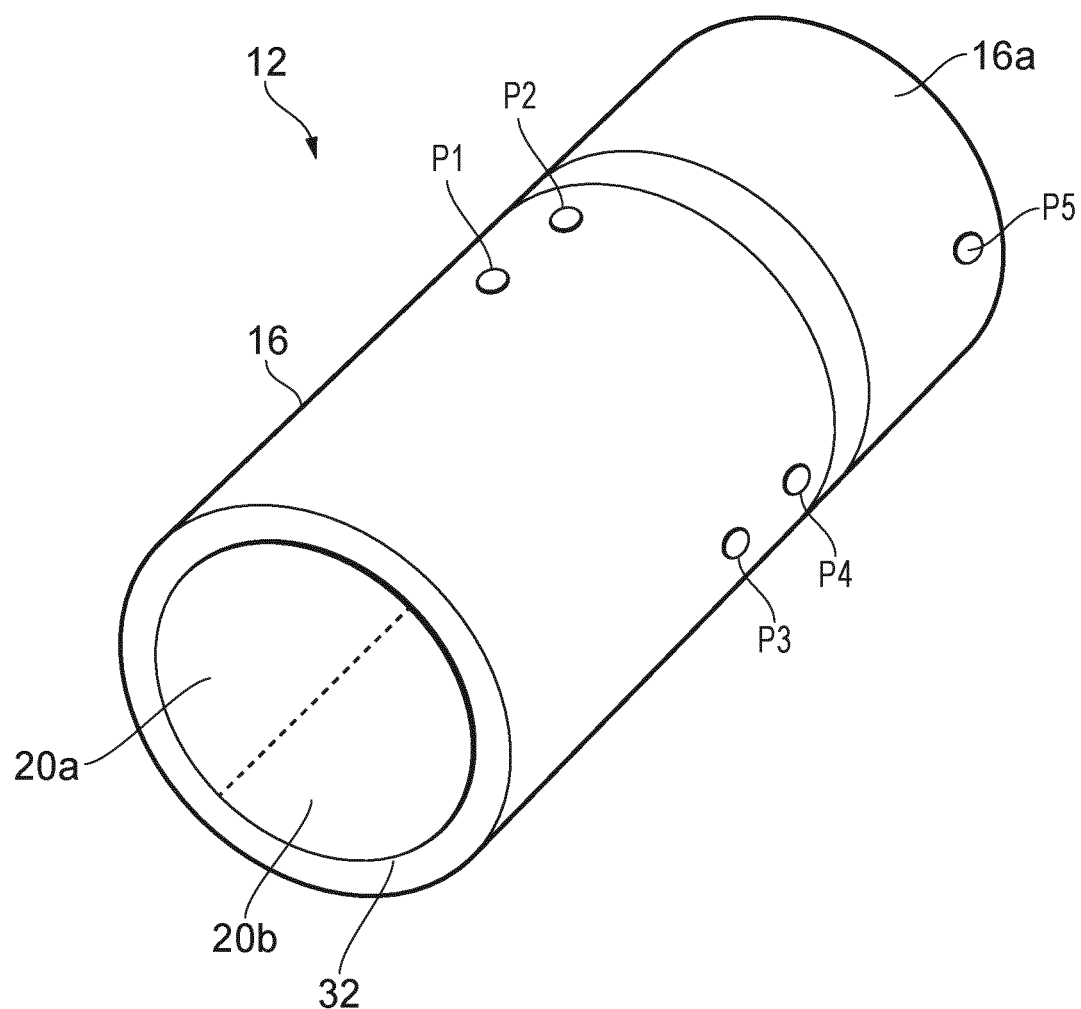
FIG. 2 is a diagram of a camera module of the mobile device of FIG. 1.

Referring now to FIG. 2, the computing device of the illustrated embodiment comprises a camera module 30 for imaging in harsh environments. The camera module 30 has a casing 16 that defines a watertight housing having an interior space. One end of the casing 16 includes a transparent window or lens 32. The cameras 20a and 20b are mounted within the interior space and arranged to capture images of the exterior environment through the window 32. The interior space of the casing 16 can be accessed by removing a casing end cap 16a which is removably coupled to a body of the casing 16 via an o-ring sealed flange. A seal can be provided between the casing end cap 16a and the body of the casing to inhibit water ingress. The casing 16 of this embodiment is formed from stainless steel and is cylindrical in shape so as to be structurally resistant to high pressures which may be experienced by the camera module 30 in an underwater harsh environment such as deep underwater environment and/or a subsea oil and gas infrastructure site. In other embodiments the material and/or shape of the casing 16 can be changed depending on the deployment environment, e.g. aluminium, copper beryllium, titanium, plastic, ionomers, PEKK, carbon fibre or ceramics in order to provide stress, chemical and/or temperature resistance. It is preferred that the material and shape of the casing 16 results in a strong and rigid structure. The shape of the casing 16 can be any pressure resistive shape such as a prism or cylinder. The cameras 20a and 20b can form part of the casing 16 such that the casing 16 forms a fluid seal with at least part of the cameras 20a and 20b, e.g. the lens of the camera 20a and/or 20b. Other end cap seals can be formed using methods including through-bolts or a threaded tube. Some or all of the component of the computing device 12 can be housed within the casing 16. Ports P1-P5 can be provided for wired connections to other camera modules, camera modules or the like to provide external data links while the camera module is operating in a harsh environment such as subsea.

Figure 3:
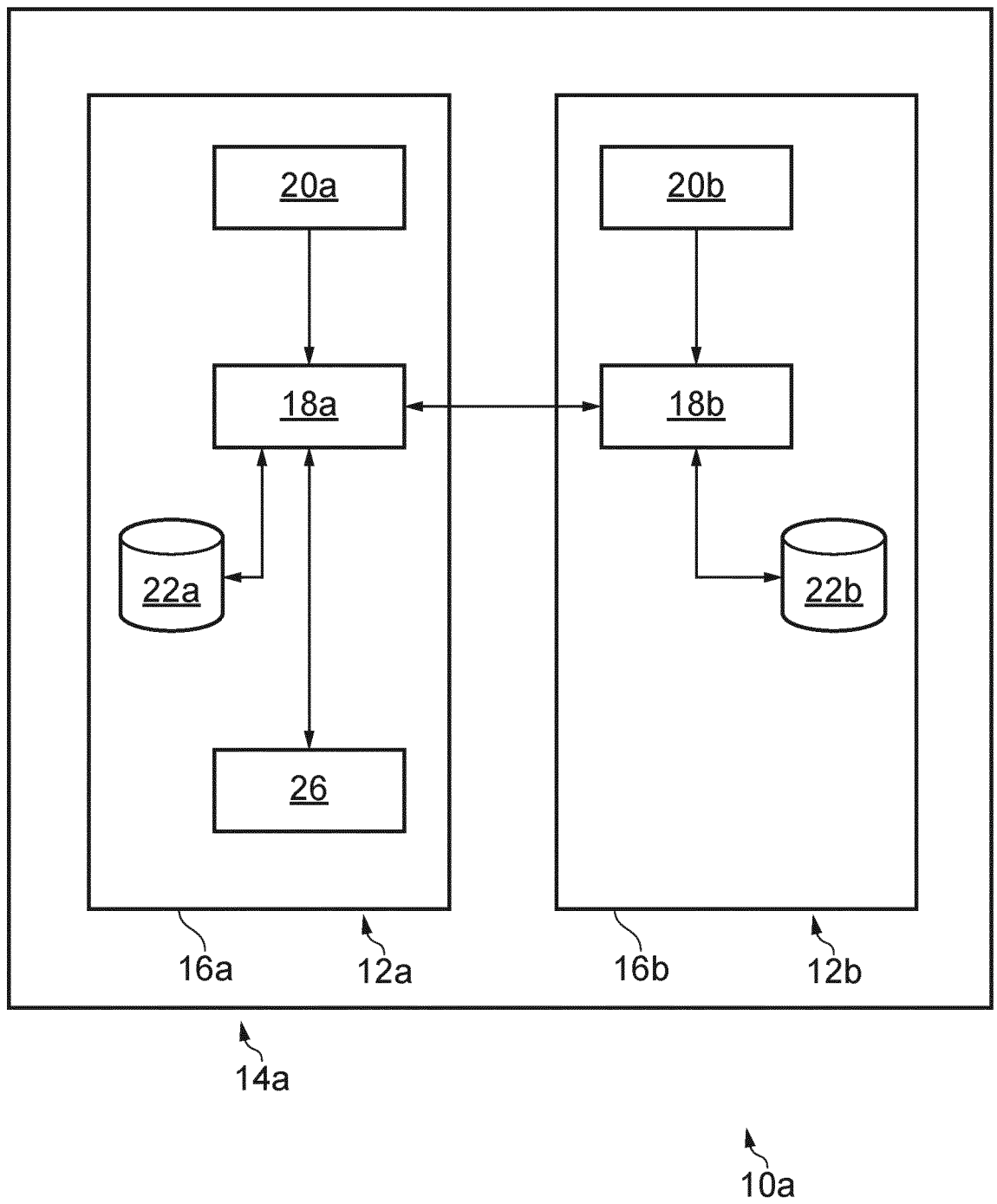
FIG. 3 is a system diagram of a mobile device according to a further embodiment of the invention.

While in the embodiment described above both cameras 20a, 20b are housed in a common casing 16, each camera can in other embodiment be mounted in a respective casing to form respective camera modules 12a, 12b. For example, as shown in FIG. 3, a computing device 10a according to a further embodiment can comprise a pair of camera modules 12a and 12b mounted on a remotely operable or autonomous vehicle 14a. Otherwise, the computing device 10a can be functionally identical to the computing device 12 of FIGS. 1 and 2. The camera modules 12a and 12b have respective protective casings 16a and 16b to enable them to work in a harsh environment such as subsea. The camera module 12a comprises a data processor 18a communicatively coupled to camera 20a to receive images from the cameras 20a. The camera 20a is a colour filter array (CFA) image camera. The camera module 12b comprises a data processor 18b communicatively coupled to camera 20b to receive images from the camera 20b. The camera 20b is a full colour camera or a generic camera configured to output a full RGB colour image. Either camera module 12a, 12b can comprise the transceiver 26 or both can comprise a transceiver 26.

Figures 4, 5, 6:
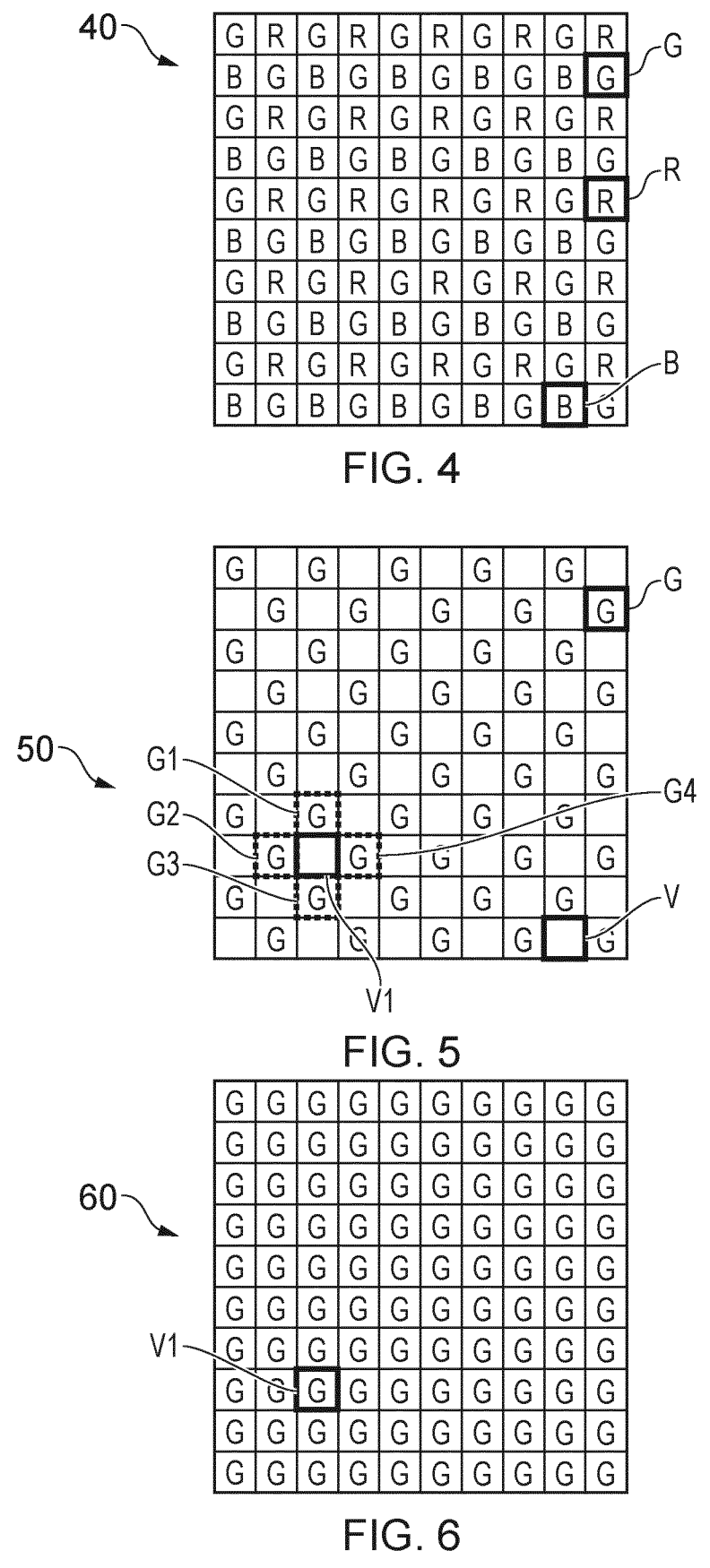

Referring to FIG. 4, a specific example of a CFA pattern (the output of the CFA imaging device 20a) is shown, namely a Bayer pattern 40 which uses green G, red R and blue B pixels. In other embodiments any CFA pattern and colours can be used. The Bayer pattern 40 is a filter positioned in front of a single sensor camera so when an image is taken an image is produced which consists of green G, red R, and blue B pixels. Each pixel has an associated numerical value which is representative of the respective amount of light of that colour of the image subject.

Known computer vision tasks and algorithms use luminance as the input to generate an output. Luminance is derived from the combination of all the colours of the CFA pattern, generally each value associated with each colour is weighted by a different amount to generate the Luminance value.

In most single sensor cameras (e.g. colour camera 20b) using a CFA, the raw data from the captured CFA image is immediately demosaiced to generate three colour channels each with the same resolution as the CFA. Demosaicing is a two step process comprising: i) isolating or separating out the colours of the CFA pattern to generate a pattern of same colour pixels (as shown in FIG. 5, pattern of pixels 50) for each colour of the CFA (e.g. three: red, green and blue); and ii) interpolating each pattern of same colour pixels to generate three colour channels (e.g. red, green, blue), each with the same resolution as the CFA. These three colour channels can be combined to generate a full colour image. This process is done automatically and on each image for a conventional CFA colour camera by the cameras built in processor.

The present inventors have recognised that a single colour of a CFA can be used as a proxy for luminance without significantly affecting the computer vision tasks or algorithms. The single colour can be the colour which is weighted the most or the colour which is most present in a given image environment. For example, in underwater environments there is a greater proportion of green light in comparison to the other colours of light. Moreover, green light is also generally weighted the most for a luminance calculation. Thus, for subsea surveying environments it can be advantageous for computer vision tasks and algorithms to be performed with only a green colour input.

FIG. 5 shows that in contrast to the conventional method above, since only one colour channel is required, the raw data from the captured CFA image is transferred from the camera to the data processor 18. Pixels of the first colour are isolated, which generates a pattern of pixels 50 in which the remaining colour pixels are removed. In their absence, void pixels V are shown with the existing pixels of the first colour G. This pattern of pixels 50 represents a subsampled green image referred to herein as a colour channel. This pattern of pixels can be processed directly by a computer vision algorithm.

As shown in FIG. 6, the void pixels V can be populated to generate a full resolution colour channel image comprising pixels of the colour channel. Four methods for generating a full resolution colour channel image, assuming bayer type CFA are:
1. Simply interpolate missing colour pixels from four neighbours.
2. Demosaic only the colour channel.
3. Simply average the two colour pixels in a 2 by 2 block (this generates a quarter resolution smoothed image).
4. Pick only pixels where both coordinates are even (this generates quarter resolution decimation).

These methods can be adapted for other colour filter array types, for example Fuji X-trans, RGBW or RGBE. Known filtering techniques can be performed to avoid any aliasing issues in the case of method 4.

For example, in FIG. 5, the void pixel V1 can be populated by interpolation of its four neighbours, G1, G2, G3, G4. The interpolation can be repeated for all void pixels V of the image.

FIG. 6, shows the resulting full resolution colour channel image 60. This can useful for some processes such as error detection in the final processed data, improving the object detection and 3D reconstruction algorithms (i.e. machine learning), and displaying information.

The colour channel 50 can be processed using a first computer vision algorithm to generate first image metadata.

The image metadata can be data which defines the edges of shapes or objects present in the imaged environment. Alternatively, the metadata can define a disparity, segmentation or motion. Image metadata corresponding to motion can be found from two CFA images taken sequentially, both of these images will be processed to generate a first colour channel, both will be processed to generate first image metadata, the two images can then be processed to find out regions where motion has occurred and record that as image metadata.

The image metadata can also be generated from a full colour image. This full colour image can be generated from a colour camera or a CFA camera with demosaicing capability. From this full colour image a full resolution colour channel can be isolated (separated) from the other full resolution colour channels. This can be the full resolution green colour channel. For efficient processing the full colour image is generally subsampled to generate a subsampled resolution green colour channel to be processed using computer vision algorithms. Therefore, the full resolution colour channel or the subsampled can be used as a proxy for luminance and downsampled/subsampled for processing by the first computer vision algorithm to generate second image metadata.

Once the image metadata is generated, it is optionally possible to further process the image metadata with an object detection algorithm. The algorithm can detect an object in the processed image and further can assign a label and/or location to said object. For example, the object might be shown completely in a single image (e.g. a handle), or the object might be shown partially and over multiple images (e.g. a pipeline). The object detection algorithm is optionally performed separately and on a full colour image, e.g. from the full colour camera. Due to the colour being an important factor in helping to identify an object, inputting the full colour image to the algorithm can result in superior object detection, in terms of accuracy and speed. Object detection consists of two processes: feature detection and object classification. Feature detection and object classification can be performed using algorithms known to those in the art, however, object classification is potentially more resource intensive, e.g. power, time, etc.

Object detection and 3D reconstruction can be performed at different rates. For example, a 3D reconstruction can be updated frequently to produce a high resolution 3D model, whereas object detection can be performed if a new object is present in the environment. If no new object is present then feature detection and tracking algorithms can be performed without the object classification process. These feature detection and tracking algorithms can be performed accurately with only the colour channel, i.e. without the need for a full colour image. Tracking allows the output of the object classification process, i.e. object label and/or location, to be updated without the need for performing object classification. Tracking algorithms perform efficiently when the difference between two images is small. This can be achieved with a high frame rate, or a slow moving object or camera. In one example, the feature detection is always performed on the colour channel and only when the feature detection algorithm doesn't recognise a set of features representative of a new object, is the object classification algorithm performed using the location of the features on the full colour image. The location of the features can be efficiently found when the colour channel is derived from the full colour image, because the features are identical.

The first image metadata and second image metadata is processed to generate processed data. The processed data comprises a plurality of data points. The plurality of data points can make up 3D model data. The image metadata is processed via a 3D reconstruction algorithm which can generate a point cloud. Alternatively, the 3D reconstruction algorithm can generate a mesh model, or any other type of model. The points of a point cloud are the data points. The data points correspond to certain pixels, or alternatively clusters of pixels, in the original image where those data points were derived from, such that each point can have an associated colour value.

Alternatively, the processed data can be a key frame, or a selective image segment, or a combination of a key frame, selective image segment, and/or 3D model data. When the processed data is a key frame the plurality of data points are simply each pixel of the image. When the image data is a selective image segment, this can identify an object in the image, specifically, an object in the field of view when the image was taken. In this case the plurality of data points can be the pixels that represent or make up that image, or vice versa.

Each data point is further correlated with a corresponding image region of the CFA image and/or the full colour image. In the case of the data point being a 3D model data point, the data point is derived from both the first image metadata and the second image metadata. Thus, either the captured image relating to the first image metadata or the second image metadata can be used to derive the colour of the data point.

Figures 7A, 7B, 8:
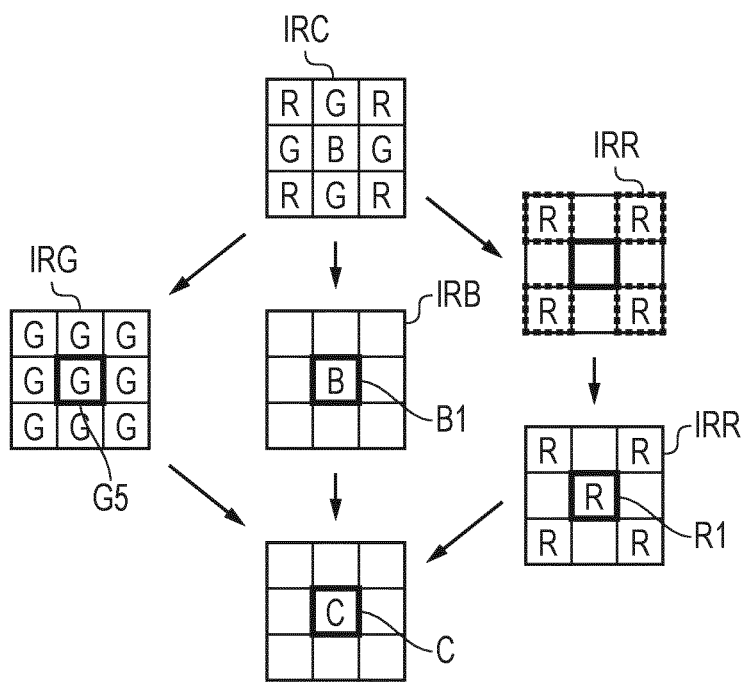
FIG. 7a is a representation of selecting an image region of the green colour channel of FIG. 6.
FIG. 7b is a representation of selecting a corresponding image region of the CFA of FIG. 4.
FIG. 8 is a representation of generating coloured processed data from the image region.

In an example of generating the colour of a data point from the CFA image, as shown in FIG. 7a and FIG. 7b, the data point G5 is correlated with corresponding image region IRG of the first colour channel 60 and the corresponding image region IRC of the CFA image 40. While in this embodiment the image region IRG, IRC consists of nine pixels, in other embodiments the image region can be larger or smaller.

The colour, or colours, of the data point can be extracted from the relative location of the image region of the full colour image taken from the colour camera.

The full colour image is stored in a memory before, or in parallel to, isolating the colour channel from the full colour image.

Alternatively, the colour, or colours, of the data point can be extracted from the relative location of the image region of the CFA image. In this alternative embodiment, each full colour pixel can be generated by the combination of corresponding pixels of each colour channel. For example, FIG. 8 shown the generation of a full colour pixel C from an image region of the CFA image. The colour pixels from the corresponding image region IRC are extracted from image region IRC as shown by the blue pixels IRB of the image region IRC and the red pixels IRR of the image region IRC. The red pixels IRR are interpolated to generate a central red pixel R1 of the image region IRC. The full colour pixel C corresponding to pixel G5 is then generated from the corresponding colour pixels of the image regions IRR, IRB and IRG. This is done using the green pixel G5 of image region IRG, the blue pixel B1 of IRB, and the central red pixel R1. Each colour pixel G5, B1, R1 corresponding to the full colour pixel C is weighted by its corresponding numerical value, which is representative of the respective amount of light of that colour. The corresponding numerical value can be coded out of 255 i.e. 1 byte. This is essentially demosaicing of the image region IRC of the CFA image.

Alternatively, both the first image metadata and the second image metadata can be used if some statistical averaging or weighting is used. This is advantageous because multiple pixels may not have the same exact colour due to camera angle and shadows. Deriving the colour for the 3D model data point is most efficient (power, time) when the full colour image is used. The amount of power used is of critical importance in harsh environments such as subsea due to the enclosed casing and further for the process to occur in real-time the processing must keep up with the frame rate of the captured images. Although, the frame rate can be changed in order for the process to occur in real-time. Alternatively, using both images can yield the greatest accuracy is processing power and time are not an issue.

Alternatively, 3D model data does not need to be coloured. For example, 3D model data does not need to be coloured for autonomous rover control through the environment or for a survey of the environment.

Figure 9:
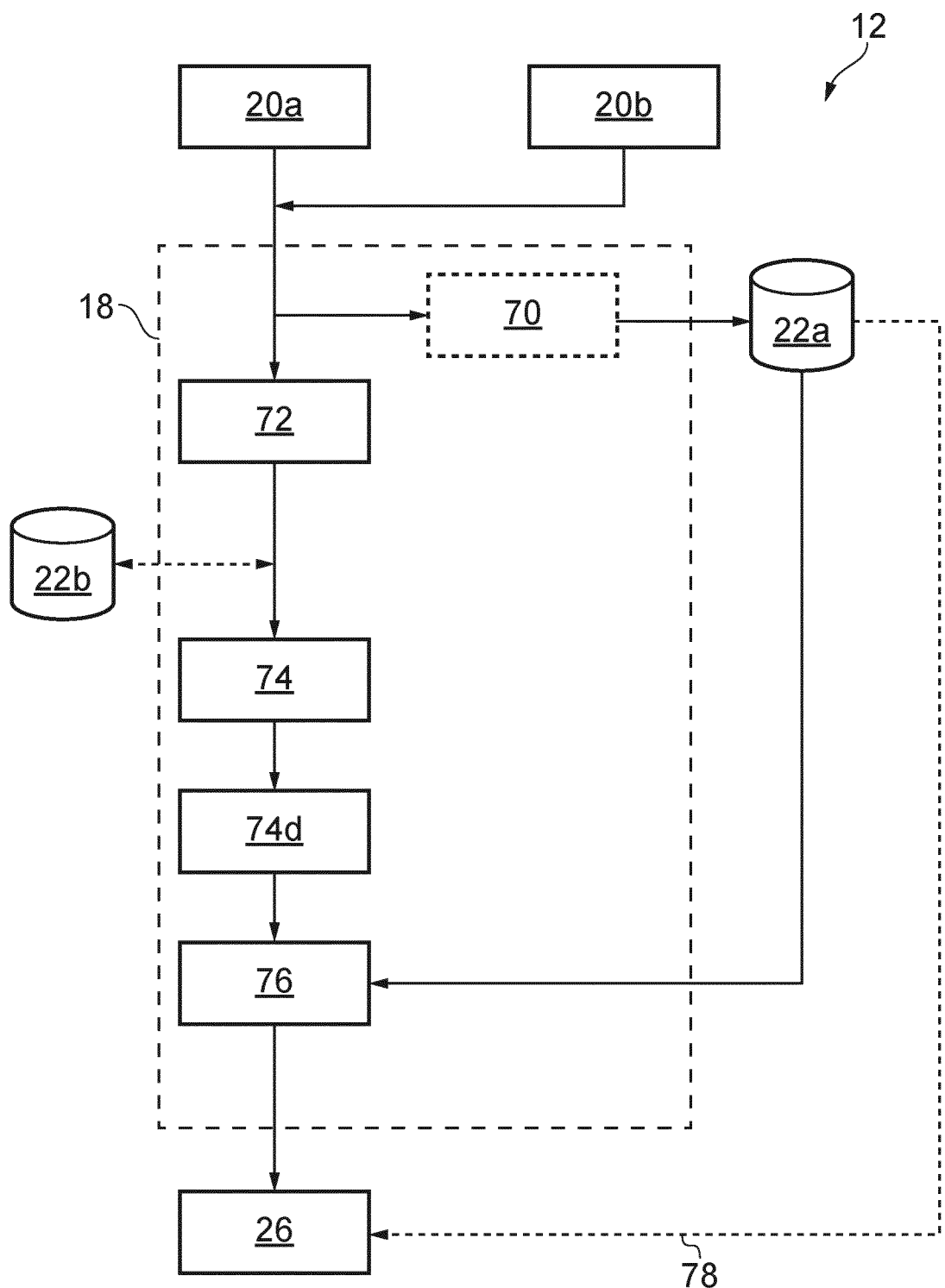
FIG. 9 is a system diagram of a mobile device according to a further embodiment of the invention.

FIG. 9 shows the processes within data processor 18 that occur on a computing device such as 12 or 12a and their relation to memory 22 of FIGS. 1 and 2, shown as storage 22a, and as an optional cache 22b in FIG. 9.

Storage 22a stores the CFA image from the camera 20a and/or stores the full colour image from the camera 20b. The stored CFA image is raw data. Full colour video can be recovered offline from the raw data via demosaicing after being stored. Alternatively, the CFA image can be demosaiced 70 to generate a full colour image prior to being stored in storage 22a. Storage 22a can be connected via a local high bandwidth link.

The raw data is processed at 72 to isolate pixels of the first colour to generate the first colour channel 50. The full colour image is also processed at 72 to also isolate pixels of the first colour to generate the second colour channel. This can be full resolution or subsampled resolution.

The video processor 74 generates first image metadata from the first colour channel 50 using a computer vision algorithm. The computer vision algorithm can process one or more frames at a time to generate the first image metadata. The video processor 74 can also generate second image metadata from the second colour channel using a computer vision algorithm. The computer vision algorithm can process one or more frames at a time to generate the second image metadata.

Alternatively, the video processor 74 may also identify certain parts of the image (for example, objects in the image) using the image metadata which can be transmitted via the transceiver 26. The transceiver link is a low bandwidth link.

The video processor 74d performs the 3D reconstruction algorithm such as simultaneous localisation and mapping (SLAM) to generate a plurality of data points which make up a 3D point cloud. The 3D reconstruction algorithm takes as an input at least the first and second image metadata. This 3D point cloud can be used to autonomously navigate the autonomous vehicle 14, for viewing the model off site, and for aiding object detection algorithms. It should be noted that in this embodiment, at no stage are whole frames demosaiced. The 3D point cloud can optionally be sent via the transceiver 26.

Alternatively, the video processor 74*d* can generate or select a key frame, a selective image segment of interest based on the first and/or second image metadata.

In an optional step, the colourer 76 receives the plurality of data points and generates coloured data points from the full colour pixels or collection of pixels in the full colour image from the full colour image stored in the storage 22*a*. The colourer can either retrieve the specific colour pixels needed for colouring data points, or can retrieve the whole image and then select the specific colour pixels needed for colouring data points. This can depend on how resource constrained each processor 18*a*, 18*b* is at a particular point in time. This generates a full colour 3D point cloud which can be transmitted via transceiver 26. This full colour point cloud can be used to autonomously navigate the autonomous vehicle 14, and for viewing the model off site. It should be noted that in this embodiment, at no stage are whole frames from the CFA imaging device demosaiced.

Alternatively, the colourer 76 can receive a corresponding full colour image from storage 22*a* by demosaicing the stored raw data in a second thread/processor. Moreover, the raw data in the storage 22*a* can be transmitted via transceiver 26 to processing off site at shown by link 78.

In other embodiments, the raw data can be processed at 72 to interpolate pixels of the first colour. These interpolated pixels form a full resolution first colour channel such as 60 in FIG. 6 and are stored in a cache 22*b*. The cache 22*b* can store many of these images. These images can be used for aiding object detection algorithms, or for viewing off site.

Figure 10:
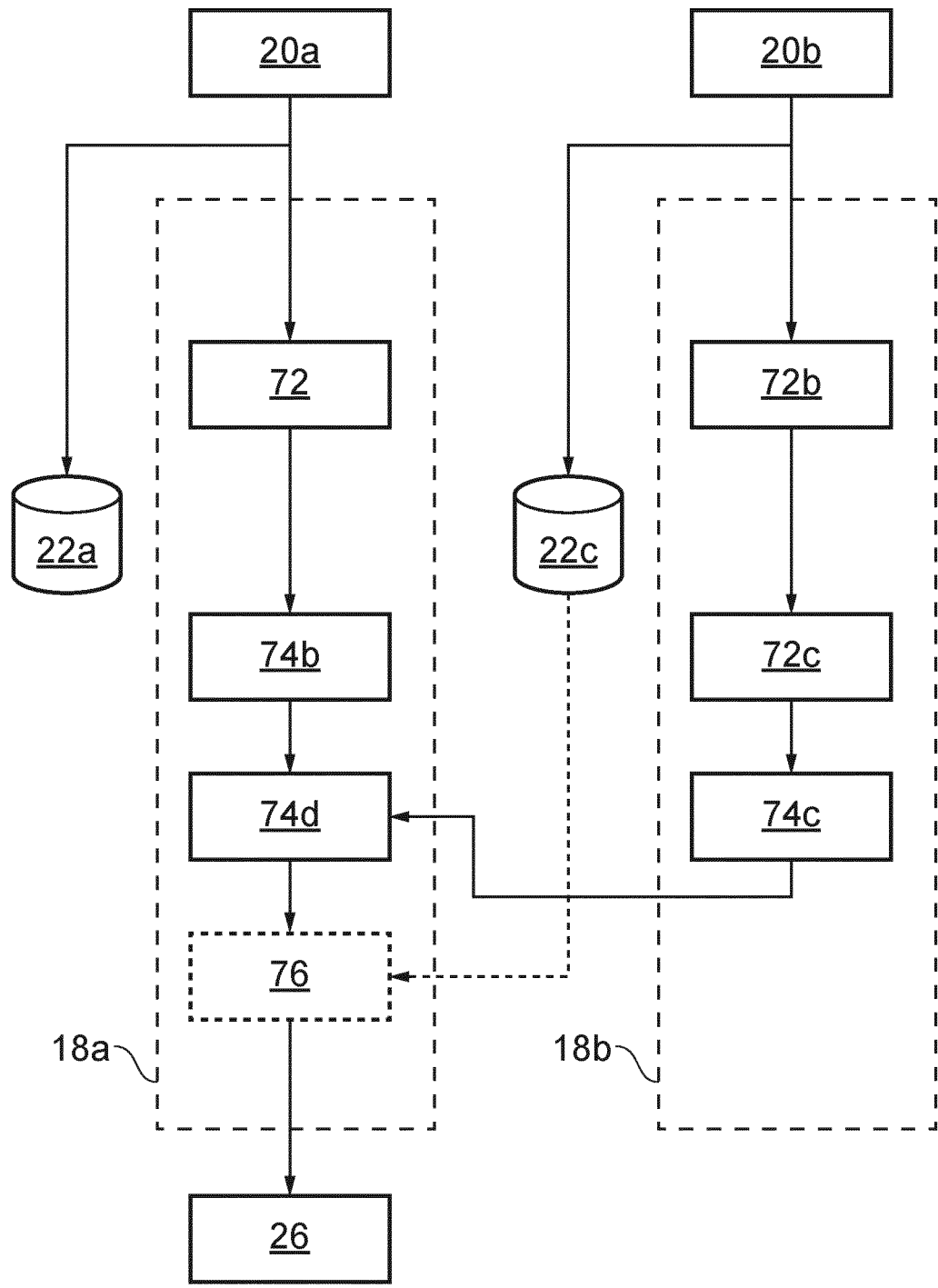
FIG. 10 is a system diagram of a mobile device according to a further embodiment of the invention.

Referring to FIG. 10, a further embodiment shows the processes for generating processed video data with two data processors 18*a* and 18*b* (although these could be a single processor 18) that occur on computing devices 12*a* and 12*b* respectfully and their relation to memory 22 (shown as storage 22*a*, and 22*c*). Specifically, FIG. 10 shows the generation of 3D model data and the transmission of said data. However, the 3D model data can be used for navigation as well as surveying the harsh environment. Common elements with FIG. 9 are labelled as such and operate in substantially the same way unless specified otherwise.

Storage 22*c* stores the full colour image from the camera 20*b*. The stored full colour image can optionally be used by the colourer 76.

The full colour image is processed at 72*b* to isolate the green colour channel from the full colour image to generate a colour channel similar to the full resolution colour channel image 60, from FIG. 6. The colour channel is fed into a downsampler 72*c* to downsample the colour channel to generate a second colour channel, for example, a sub-sampled green image similar to the pattern of pixels 50 of FIG. 5.

The video processor 74*b* generates first image metadata from the first colour channel using a computer vision algorithm. Specifically, it performs feature detection and feature tracking algorithms. The computer vision algorithm can process one or more frames at a time to generate the first image metadata.

The video processor 74*c* generates second image metadata from the second colour channel using a computer vision algorithm. Specifically, it performs only feature detection. The computer vision algorithm can process one or more frames at a time to generate the second image metadata.

Optionally, the colourer 76 receives the plurality of data points and generates coloured data points from using the full colour image stored in the storage 22*c*.

Thus, the computer vision processing pipeline can be advantageously separated from visualisation, meaning that processors and/or cores can be apportioned depending on the processing needs of each pipeline. An advantage of this separation is that the data being transferred from 18*b* to 18*a* (e.g. pixels of a full colour image and second image metadata) is of relatively low bandwidth. This allows a low bandwidth link to be provided between the two data processors 18*a*, 18*b*, which is advantageous for harsh environments such as subsea.

The CFA camera enables the efficient generation of a single colour channel i.e. the first colour channel 50 at the raw resolution. A single colour channel at the raw resolution can be used for feature tracking and feature detection. This colour channel does not need to be interpolated. Considering a processing bandwidth limit, the processing of a single colour channel at the raw resolution allows for a greater frequency of images to be processed per unit time because the images are of relatively low resolution in comparison to full colour images. Full colour images allow for object detection algorithms to run efficiently although this process is resource intensive and takes longer than feature tracking and feature detection.

Feature detection algorithms can run from the second colour channel, derived from the full colour image. Feature detection on the second colour channel is necessary to contribute towards generating a 3D model. However, together, object detection and feature detection are resource heavy leaving little processing capacity towards the processing bandwidth limit. Thus, the full colour images can be of a lower spatial or temporal resolution than the CFA camera in order to keep up with the CFA camera for use in real-time. Put another way, the CFA camera has processing headroom to run alternative modes.

For example, the colour camera and CFA camera can operate at the same spatial resolution, although the CFA camera may operate at a higher framer rate than the colour camera. This can result in better tracking due to less movement between frames. Alternatively, the CFA camera can operate with a higher dynamic range to give improved tracking in low light conditions.

In another example, the colour camera can operate at a lower frame rate than the CFA camera, but operate at a higher resolution.

In another example, the full colour camera can operate at the same frame rate as the CFA camera, but operating at a lower spatial resolution, for example half. This allows the CFA camera and the full colour camera to be fully 1:1 synchronised, and a more inexpensive full colour camera. Another benefit is that the CFA image, being of a higher resolution, can give better quality frames which can aid in object detection if the colour image is not of a high enough quality for the object classification process. It is known that the object of interest is very small and only covers a certain number of pixels e.g. fewer than: 5000 pixels, 2000 pixels, 1000 pixels, 500 pixels, 250 pixels, etc.

The high resolution images from the CFA camera coupled with a high frame rate, and lower resolution of the full image camera, can enable almost double the output resolution with a bandwidth of half of that of a generic prior art colour video processing system.

Both the CFA and full colour camera can be synchronised. If the full colour camera is in a lower temporal resolution state than the CFA camera then this could mean synchronising every other image due to a lower frame rate. Alternatively if the cameras are at a very high frame rate frequency, such as 300 Hz, then they could potentially be un-synchronised, due to the small deviation in adjacent frames. This could be used for other use cases where a high frequency of frame rates is required.

Figure 11:
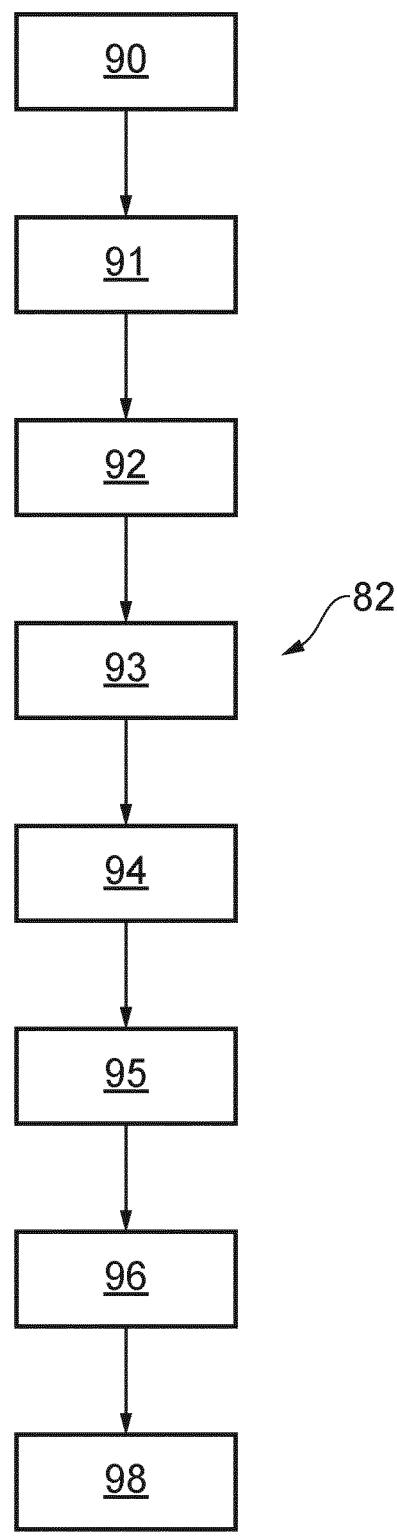
FIG. 11 is a flow chart of a method for colour video processing according to an embodiment of the invention.

Referring to FIG. 11, embodiments of the invention extend to a computer implemented method for colour video processing, shown generally at 82.

At step 90 the method comprises receiving a CFA image from a CFA imaging device, wherein the CFA image comprises CFA image pixels defining a plurality of image regions, each image region having at least one pixel of a first colour and at least one pixel of a second colour.

At step 91 the method comprises receiving a full colour image from a colour imaging device, wherein the full colour image can comprise demosaiced image pixels.

The cameras are arranged such that an object is imaged by both the CFA imaging device and the colour imaging device and represented on the CFA image and the full colour image.

At step 92 the method comprises storing the full colour image in a memory.

At step 93 the method comprises isolating pixels of the first colour of the CFA image to generate a first colour channel comprising pixels of the first colour channel.

At step 94 the method comprises isolating pixels of the first colour of the full colour image to generate a second colour channel comprising pixels of the second colour channel.

At step 95 the method comprises processing the pixels of the first colour channel using a first computer vision algorithm to generate first image metadata.

At step 96 the method comprises processing the pixels of the second colour channel using the first computer vision algorithm to generate second image metadata.

At step 98 the method comprises generating processed data using the first image metadata and/or the second image metadata, the processed data comprising a plurality of data points representing the object.

Mobile devices and methods according to embodiments of the invention can be utilised in the field of offshore and subsea survey but can also apply to any survey system for hazardous environments such as space, nuclear, mining, etc. The survey can be performed either autonomously, semi autonomously, manually via remote control, or manually using a minimal size crew in order to reduce the risk. Sending crews to hazardous locations involves the inconvenience of taking safety precautions and therefore increases the cost. The mobile device can, for example, be a ROV or AUV.

Although the invention has been described above with reference to one or more preferred embodiments, it will be appreciated that various changes or modifications can be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. A computer implemented method for colour video processing, the method comprising:
    receiving a colour filter array (CFA) image from a CFA imaging device, wherein the CFA image comprises CFA image pixels defining a plurality of image regions, each image region having at least one pixel of a first colour and at least one pixel of a second colour, at least one image region representing a portion of an object;
    receiving a full colour image from a colour imaging device, wherein the full colour image represents the portion of the object;
    storing the full colour image in a memory;
    isolating pixels of the first colour of the CFA image to generate a first colour channel comprising pixels of the first colour channel;
    isolating pixels of the first colour of the full colour image to generate a second colour channel comprising pixels of the second colour channel;
    performing a first computer vision algorithm to generate first image metadata from the first colour channel;
    performing the first computer vision algorithm to generate second image metadata from the second colour channel; and
    generating processed data from the first image metadata or the second image metadata, the processed data comprising a plurality of data points representing the object.

2. The method of claim 1, wherein the method further comprises:
    correlating a data point from the plurality of data points with a corresponding image region of the full colour image; and
    generating colour processed data by modifying the colour of the data point using at least one pixel of the full colour image.

3. The method of claim 1, wherein the first image metadata comprises one of: motion; disparity; edges; and segmentation and the second image metadata comprises one of: motion; disparity; edges and segmentation.

4. The method of claim 1, wherein the processed data comprises one of: key frame; selective image segment; and 3D model data.

5. The method of claim 1, wherein the second image metadata is processed with an object detection algorithm, to detect the object in the full colour image, and assign a label and location to the object.

6. The method of claim 1, wherein the first image metadata is processed with an object detection algorithm, to detect the object in the first image metadata, and assign a label and location to the object.

7. The method of claim 1, wherein the first colour channel is green.

8. The method of claim 1, wherein isolating pixels of the first colour of the full colour image further comprises downsampling the pixels of the first colour of the full colour image to generate the second colour channel.

9. The method of claim 1, further comprising demosaicing the CFA image to generate a demosaiced full colour image and optionally saving the demosaiced full colour image in the memory.

10. The method of claim 1, further comprising transmitting the processed data to an external computing device via a low bandwidth link.

11. A computer implemented method for colour video processing, the method comprising:
    receiving a colour filter array (CFA) image from a CFA imaging device, wherein the CFA image comprises CFA image pixels defining a plurality of image regions, each image region having at least one pixel of a first colour and at least one pixel of a second colour, at least one image region representing a portion of an object;

receiving a full colour image from a colour imaging device, wherein the full colour image represents the portion of the object;

storing the full colour image in a memory;

isolating pixels of the first colour of the CFA image to generate a first colour channel comprising pixels of the first colour channel;

isolating pixels of the first colour of the full colour image to generate a second colour channel comprising pixels of the second colour channel;

performing a first computer vision algorithm to generate first image metadata from the first colour channel;

performing the first computer vision algorithm to generate second image metadata from the second colour channel; and generating processed data from the first image metadata and the second image metadata, the processed data comprising a plurality of data points representing the object, wherein the processed data comprises one of: key frame; selective image segment; and 3D model data and, wherein the data points are 3D model data points, and the step of generating processed data further comprises:

processing the first image metadata with a feature detection algorithm, to detect a first feature in the CFA image;

processing the second image metadata with the feature detection algorithm, to detect a second feature in the full colour image; and generating one of the plurality of data points based on the first feature and the second feature.

12. A method of surveying an environment, the method comprising:

moving a mobile device within a survey site, the mobile device implementing the method of claim 1.

13. A mobile device for surveying in an environment, the mobile device comprising:

a CFA imaging device configured to generate a CFA image;

a colour imaging device distinct from the CFA imaging device and being configured to generate a full colour image, a platform on which the CFA imaging device and the colour imaging device are mounted with an overlapping field of view;

a first data processor and a second data processor together configured to execute the method according to claim 1;

a first data link coupled between the CFA imaging device and the first data processor;

a first computer memory coupled to the first data processor;

a second data link coupled between the colour imaging device and the second data processor; and a first casing arranged to be mounted on the platform and defining a sealed interior space, at least the CFA imaging device, the first data processor and the first data link being housed within the sealed interior space of the first casing, the CFA imaging device being arranged to face outwardly from the first casing to capture CFA images.

14. The mobile device of claim 13, further comprising:

a second casing defining a sealed interior space, the second casing being arranged to be mounted on the platform, wherein the second casing comprises the colour imaging device, the second data processor, and the second data link, the colour imaging device being arranged to face outwardly from the second casing to capture full colour images; and a third data link coupled between the first and second data processors, optionally outside of the sealed interior spaces of the first and second casings.

15. The mobile device of claim 13, wherein the mobile device is a subsea mobile device.

16. The method of claim 1, wherein the step of performing a first computer vision algorithm to generate first image metadata from the first colour channel comprises performing a detection, or tracking algorithm to generate first image metadata from the first colour channel and wherein the step of performing the first computer vision algorithm to generate second image metadata from the second colour channel comprises performing a detection, or tracking algorithm to generate second image metadata from the second colour channel.

17. The method of claim 1, wherein the step of performing a first computer vision algorithm to generate first image metadata from the first colour channel comprises performing feature detection and feature tracking algorithms to generate first image metadata from the first colour channel and wherein the step of performing the first computer vision algorithm to generate second image metadata from the second colour channel comprises performing feature detection to generate second image metadata from the second colour channel.

* * * * *